United States Patent [19]

Forsberg et al.

[11] Patent Number: 5,410,577
[45] Date of Patent: Apr. 25, 1995

[54] CORE-MELT SOURCE REDUCTION SYSTEM

[75] Inventors: Charles W. Forsberg; Edward C. Beahm, both of Oak Ridge; George W. Parker, Concord, all of Tenn.

[73] Assignee: Martin Marietta Energy Systems, Inc., Oak Ridge, Tenn.

[21] Appl. No.: 147,853

[22] Filed: Nov. 4, 1993

[51] Int. Cl.⁶ .............................................. G21C 9/016
[52] U.S. Cl. ................................................... 376/280
[58] Field of Search .............. 376/280; 976/DIG. 143

[56] References Cited

U.S. PATENT DOCUMENTS

| | | | |
|---|---|---|---|
| 3,678,920 | 7/1972 | Cohen et al. | 376/280 |
| 4,036,688 | 7/1977 | Golden et al. | 376/280 |
| 4,146,429 | 3/1979 | Slagley | 376/280 |
| 4,300,983 | 11/1981 | Donne et al. | 376/280 |
| 4,442,065 | 4/1984 | Latter et al. | 376/280 |

OTHER PUBLICATIONS

"Development Work for a Borax Internal Core--Catcher for a Gas-Cooled Fast Reactor", Donne, et al. Nuclear Technology, vol. 39:138, Jul. 1978.
"Core-Melt Source Reduction System to Terminate and LWR Core-Melt Accident", Forsberg, et al. American Nuclear Society, Nov. 15-20, 1992.
"Core Melt Source Reduction System" Forsberg, et al. ORNL Chemical Technology Division, Oct. 1989.
"Core-Melt Source Reduction System to Terminate LWR Core-Melt Accident" Forsberg, et al., Nuclear Engineering Joint Conference ASME/JSME, 1993.

*Primary Examiner*—Daniel D. Wasil
*Attorney, Agent, or Firm*—Pitts & Brittian

[57] ABSTRACT

A core-melt source reduction system for ending the progression of a molten core during a core-melt accident and resulting in a stable solid cool matrix. The system includes alternating layers of a core debris absorbing material and a barrier material. The core debris absorbing material serves to react with and absorb the molten core such that containment overpressurization and/or failure does not occur. The barrier material slows the progression of the molten core debris through the system such that the molten core has sufficient time to react with the core absorbing material. The system includes a provision for cooling the glass/molten core mass after the reaction such that a stable solid cool matrix results.

32 Claims, 3 Drawing Sheets

CORE-MELT SOURCE REDUCTION SYSTEM

This invention was made with Government support under Contract No. DE-AC05-84OR21400 awarded by the U.S. Department of Energy to Martin Marietta Systems, Inc. and the Government has certain rights in this invention.

TECHNICAL FIELD

This invention relates to the field of nuclear reactors and core meltdown damage prevention and more specifically to core catchers.

BACKGROUND ART

In the field of water cooled nuclear reactors it is well known that the most probable accident in the nuclear reactor is a reactor core meltdown which occurs when the capability to remove heat from the nuclear reactor core is lost. When a reactor core meltdown occurs, the core melts through the pressure vessel and the molten material drops onto the containment floor, which is typically fabricated from a concrete material. The reactor is surrounded by a containment building which is intended to prevent the radioactivity from escaping into the environment.

The resultant mixture of molten and solid core material from a water cooled nuclear reactor core melt accident is "corium". Corium results from a zirconium clad fuel and is generally comprised of uranium oxide ($UO_2$), steel (Fe), zirconium oxide ($ZrO_2$), zirconium (Zr) and fission products. In a typical coremelt accident, the molten corium core is an uncoolable, high power density mass which exits the bottom of the reactor pressure vessel. The geometry of the molten corium is ill defined. The high temperature corium can penetrate the containment floor by high temperature decomposition of the concrete. When this occurs, the reaction between corium and the concrete generates flammable, noncondensable gases. More specifically, the decomposition of concrete generates carbon dioxide ($CO_2$). The resultant carbon dioxide reacts with the zirconium in corium to generate carbon monoxide (CO). Further, zirconium reacts with water in the containment and in the concrete to generate hydrogen ($H_2$). The noncondensable gases, hydrogen and carbon monoxide, may overpressurize the reactor containment causing its failure. Also, the hydrogen and carbon monoxide may burn or detonate with air in the containment building which could cause containment failure. Furthermore, with failure of the containment, the potential for leakage of radioactive material to the environment is extremely high.

Many methods for preventing containment failure have been proposed. Generally, these methods require spreading the molten material out so it can cool and freeze by flooding the underreactor cavity with water. The basic drawback to all such approaches is ensuring the distribution or geometry of the molten core material during a core-melt accident. For example, lead core catchers have been developed in an effort to solve the problems involved with a core-melt accident. Lead has a sufficiently high density to float the core debris but there is no way to absorb the core debris such that the power density of the molten core is lowered. Further, a lead core catcher can not prevent reaction of zirconium in corium with the water which drains down onto the corium with time.

A core-melt source reduction system has been developed for a gas cooled fast reactor which utilizes a stainless steel clad fuel. The major difference between the system developed for the stainless steel clad fuel and the present invention for a zirconium clad fuel is that stainless steel does not react with most materials in a core-melt accident. Unlike stainless steel, zirconium is highly reactive. Because of this highly reactive nature, there will be fundamental compositional differences between the system developed for the stainless steel clad fuel and that for zirconium clad fuel.

Therefore, it is an object of this invention to provide a core-melt source reduction system which stops the progression of a high temperature core through the containment floor during a core-melt accident.

It is another object of the present invention to provide a core-melt source reduction system which prevents the generation of noncondensable gases when the core materials react with the containment floor.

It is a further object of the present invention to provide a core-melt source reduction system which does not require any assumptions about the geometry or timing of the molten core material in a core-melt accident.

It is yet another object of the present invention to provide such a core-melt source reduction system which can be incorporated into or replace the existing containment floor.

Further, it is object of the present invention to provide a core-melt source reduction system which minimizes heat rejection to the containment floor early in the core-melt accident.

It is yet another object of the present invention to provide a core-melt source reduction system which ends the accident sequence with a long term, cold, stable state.

It is a further object of the present invention to provide a core-melt source reduction system which traps radionuclides in a solidified matrix.

DISCLOSURE OF THE INVENTION

Other objects and advantages will be accomplished by the present invention which serves to provide a system which can contain a molten core after a nuclear reactor core meltdown accident such that containment failure is prevented. The core-melt source reduction system, hereinafter "the system", of the present invention includes alternate layers of two different materials as part of the floor under the reactor. The first material reacts with and absorbs the core material in a manner such that the core spreads out and the progression of the core is slowed and ultimately halted. The second material acts as a barrier to slow the descent of the molten core through a layer of the first material to provide time for dissolution of the core materials within the first material. During the reaction between the molten core and the layers of the first and second materials, no noncondensable gases are generated such that the containment will not fail as a result of overpressurization. Further, the resultant material is a solidified thermally hot stable waste material which can ultimately be cooled to a stable state matrix. The stable state matrix is such that radionuclides are trapped within the matrix to minimize the consequences of leakage.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A core-melt source reduction system incorporating various features of the present invention is illustrated generally at 10 in the figures. The core-melt source reduction system, or system 10, is designed to slow and eventually stop the progression of a molten core through the containment floor of a water cooled nuclear reactor when a nuclear reactor core meltdown accident occurs. Moreover, in the preferred embodiment the system 10 is designed to prevent failure of the containment 24 due to overpressurization or overheating of the containment 24. Furthermore, the system 10 is designed such that a long term cold stable state matrix which traps radionuclides is a final result of the core meltdown accident.

Figure 1:
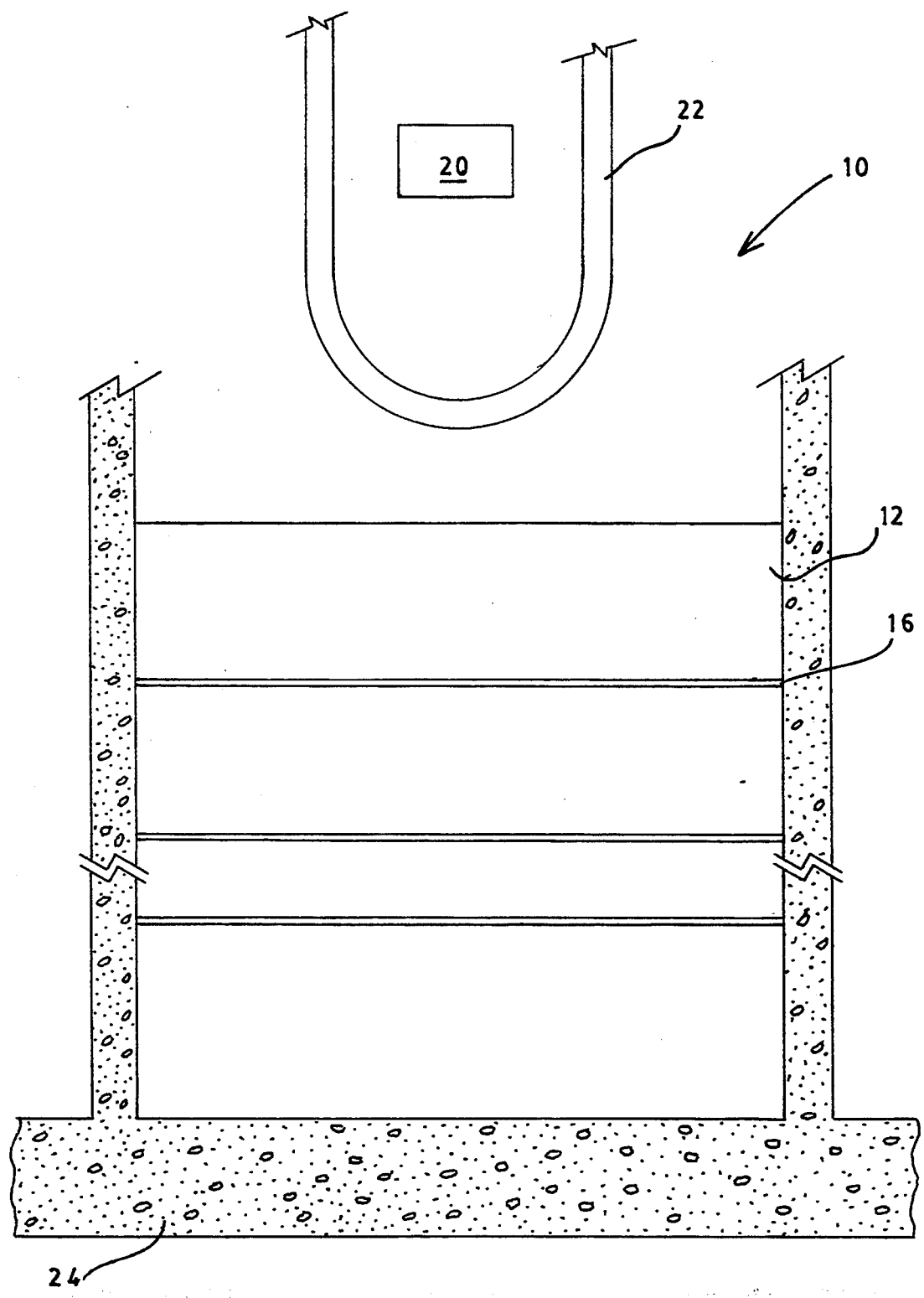
FIG. 1 is an elevation view, in section, of the core-melt source reduction system constructed in accordance with several features of the present invention.

The system 10 is generally a "core catcher" in that the molten core 20 reacts with the system 10 in a manner such that the system 10 can contain the molten core 20 and prevent containment failure. When a core-melt accident occurs, the molten core 20 melts through the pressure vessel 22. With the present invention in place, the molten core or core debris 20 will drop onto the system 10 which has been integrated into the existing containment floor 24, as shown in FIG. 1. The system 10 is generally comprised of alternate layers of two different materials as part of the containment 24 under the reactor vessel 22. The first material reacts with and absorbs the molten core and allows for cooling of the molten core. In the preferred embodiment, the first material is a glass material layer 12 which contains nonradioactive waste glass or waste glass formers. Waste glass formers are materials which form glasses when melted together. The thickness of the glass layers 12 will be dependent upon the construction of surrounding containment structure 24 which surrounds the core. The glass material layer 12 should be at least 30 cm thick such that the molten core 20 does not melt directly through the glass material layer 12 without having time to react with the glass 14. Weight constraints of the glass material layer 12 will limit it to about 100 cm thick. The glass material 14 can be in the form of glass blocks, glass shards or glass aggregate in special cements. The preferred embodiment is glass block form because of ease of installation in block form. The glass composition utilized must have a reasonably low softening point ($\sim 750°$ C.) such that the system 10 itself does not overheat the containment structure 24. It will be noted that the invention is intended to cover materials other than glass which have the capabilities described herein.

The second material is a barrier material 16. The barrier material 16 can be a thermal barrier material or a high density material. When the barrier material 16 is a thermal barrier, the material should have a relatively high melting point and show no significant gas generation. An example of a suitable thermal barrier material is a high-fired alumina or steel. When the barrier material 16 is a high density material, the material must show no significant gas generation and must have sufficient density to float the core debris 20, which typically has a density of 8.5 $gm/cm^3$, and the glass material 14. An example of a suitable high density material is lead. In the preferred embodiment, high density barriers are utilized and more specifically, lead barrier layers are employed. Lead has a density of $\sim 11.3$ $gm/cm^3$. Also, lead has low thermal conductivity. In an alternate embodiment, a combination of alternating thermal barrier layers and high density barrier layers can be used effectively.

The system 10 requires that a sufficient volume of glass 14 be present to react with and absorb the molten core 20. The thickness of the system 10 will depend upon the design of the reactor and the containment structure 24. The total depth of the system 10 varies from about 1–3 meters. For example, if the containment structure 24 is only as wide as the area of the molten core 20, the system 10 will have to be deeper. If the structure 24 is wider than the area of the molten core 20, the system 10 can be shallower.

There are at least five main objectives of the present invention. These objectives t dictate the design of the system 10 and the glass composition. A first objective is to stop the molten core 20 progression such that it does not melt through the containment 24 and failure of the containment 24 is prevented. A second objective is to provide a system 10 which does not generate noncondensable gases. A third objective is to provide a glass composition which minimizes heat rejection to the containment 24 early to prevent overheating and possible failure of the containment 24. A fourth objective is to provide a glass composition which traps radionuclides in a solidified matrix to such an extent that potential of leakage through the containment 24 is minimized. A fifth objective is to provide a glass composition which ends the accident sequence in a long term stable state.

The first task of stopping the progression of the molten core 20 and preventing melt-through and failure of the containment structure 24 is accomplished by limiting the temperature of the containment structure 24. To do this, one must understand the potential containment failure mechanisms in an uncontrolled core-melt accident. The initial high heat release rate of the core debris 20 is due to the radioactive decay heat. This high heat release rate by itself is not the problem. The problem is the high heat release rate combined with inefficient heat transfer mechanisms to dump the heat. The poor heat transfer results in a high temperature core debris 20 which can destroy the concrete containment 24. There are two reasons for the poor heat transfer. First, in some accident scenarios, the core debris 20 may pile up in a particular location and create very high local temperatures. Second, the core debris 20 primarily consists of high temperature ceramic materials which act as insulators at temperatures in excess of 2000° C. With a pile of core debris 20, the outer layers provide insulation which does not melt and drain away. The bottoms of such piles may burn holes through the concrete containment 24.

Figure 2:
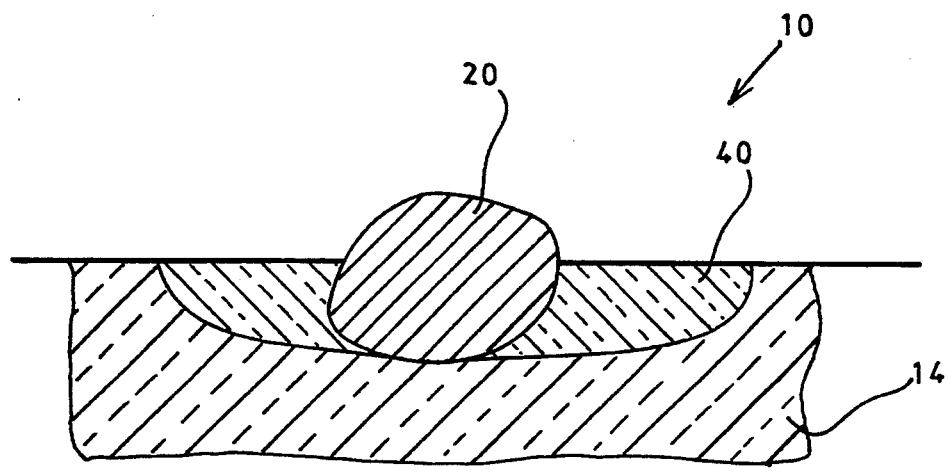
FIG. 2 is an elevation view, in section, of a portion of the core-melt source reduction system of FIG. 1 at an early stage of a core-melt accident.

The system 10 is constructed to lower the maximum temperature of the core debris 20 by improving the heat transfer. With these lower temperatures (~1000° C.), insulation and other passive techniques can successfully limit the temperatures of the containment 24. The system 10 improves heat transfer by two mechanisms. The first is by converting the radioactive high heat core debris 20 of uncertain geometry to a uniform heat source of known geometry in the form of a molten pool 40 of glass. As shown in FIG. 2, the molten core 20 drops onto the glass, it will heat and melt the glass 14 around the molten core 20.creating a molten pool 40 into which the core 20 can begin to dissolve. The glass convective currents will heat the solid glass 14 causing it to melt. Further, the glass convective currents will mix the dissolved core material in the molten glass 40. The distribution of the heat source in the glass provides a high level waste molten glass pool 40 of a known surface area that can efficiently transfer heat to the water 26 above the molten glass 40 via glass convective currents. When the expanding surface area of the molten glass 40 transfers heat to the water 26 faster than the generation of decay heat and heat from chemical reactions, the molten core's 20 progression will be halted.

The second mechanism is the efficient convective heat transfer through the glass 40 below 1000° C. The dissolution process creates a glass 40 with well defined chemical and physical properties that can dissolve almost all materials. The glass 40 withstands high radiation fields, it remains liquid over very wide temperature ranges, and its properties can be controlled. These very properties provide for the efficient convective heat transfer. No high temperature insulative layers can form between the glass 40 and the overlying water 26.

The lead barrier layers 16 provide three mechanisms to slow the process of the descent of the molten core 20, to provide time for dissolution of the core 20 in the glass 40 and to provide time for the decay of radioactive heat. First, lead has a density of ~11.3 gm/cm$^3$ which is higher than that of the mixture generally characterized as "core debris"20. Molten lead 42 gathers in low spots where the glass 40 is molten and floats the core debris 20 off the underlying solid glass 14. Lead has a relatively low melting point (350° C.) and high boiling point (1753° C.) a quality which makes it a good fluid for this application. Second, because lead has low thermal conductivity, the lead acts as a thermal/chemical barrier to the downward heat flux. This reduces melting of glass 14 below the core debris 20. Simultaneously, lead convective currents transfer heat upward from the bottom surface of the corium 20 to molten glass 40 and sideways to solid glass 14. The upward convective currents of the lead also allow for cooling of all surfaces of the molten glass 40 containing dissolved core material. The convective heat transfer preferentially melts glass in a horizontal plane. The melting glass absorbs heat and provides fresh glass to dissolve additional core debris. Third, lead is a self healing mechanism to prevent penetration of core debris 20 through the glass 40 to the containment floor 24. In a worst case accident, the core debris 20 would melt through the glass 40 before sufficiently dissolving in the glass 40. The lead would also melt sinking to the bottom through the molten glass 40 creating a molten lead bed 42 on which the core debris 20 would float such that it can not penetrate the floor of the containment 24.

In the system 10, most of the core debris 20 should dissolve rapidly; however, pieces of core debris 20 that are slow to dissolve do not by themselves create a problem. The molten lead 42 keeps the debris 20 off the floor, while the glass convective currents provide an efficient method to transfer heat to water 26 above the system 10 and maintain controllable glass temperatures (1000°-1200° C.). A sufficient molten glass 40/molten lead 42 surface area not blocked by core debris 20 is needed to minimize lead temperatures.

The system 10 requires a glass with a relatively low melting temperature to minimize the temperature of the containment 24. At the end of the initial phase of the system's operation, the core debris 20 is dissolved in a relatively homogeneous bath of glass 40 at ~1000° C. By this time, water 26 has drained down from higher locations in the containment 24 and lies on top of the molten glass 40. Strong glass convective currents transport heat to the glass/water interface 44, which maximizes upward heat transfer to the water 26. This cooling mechanism maintains maximum glass temperatures below 1150° C. When the water 26 boils, the steam enters the upper portion of the containment 24, the steam is condensed on colder surfaces, and the water 26 returns to the top of the glass 40.

The maximum downward heat flux to the floor of the containment 24 is expected to be two orders of magnitude less than the upward heat flux. The downward heat flux is limited by the layer of molten lead 42 below the glass 40, which acts as an insulator and by the layer of the system's insulation 36 below the lead 42. The insulation 36 covers the floor of the containment 24. Low heat fluxes to the floor of the containment 24 are possible because the glass temperatures are sufficiently low to allow the use of efficient insulation materials and ensure material integrity.

Figure 3:
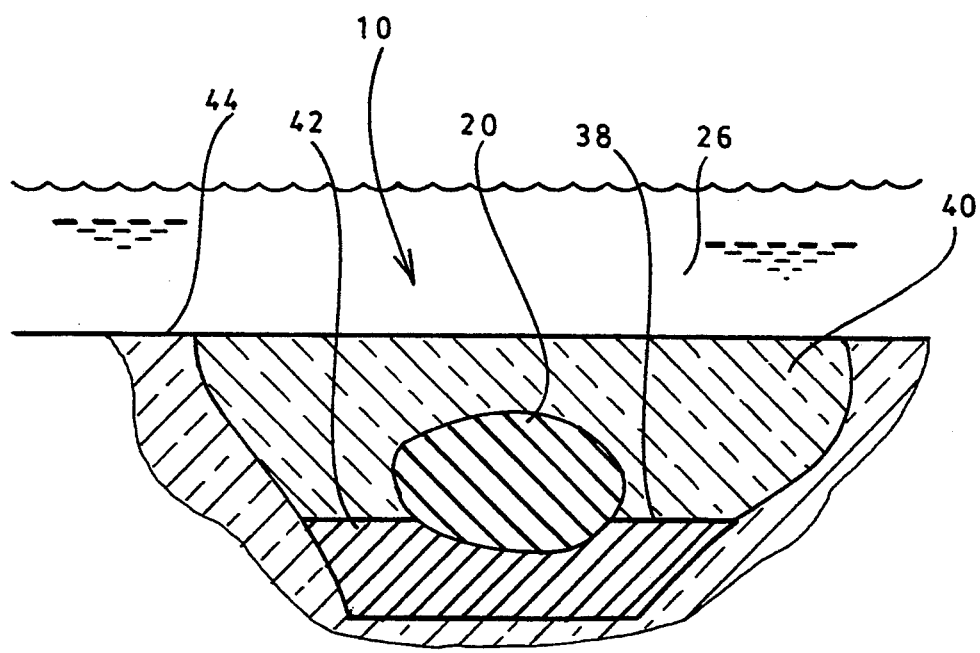
FIG. 3 is an elevation view, in section, of a portion of the core-melt source reduction system of FIG. 1 at a later stage of a core-melt accident; and, FIG. 4 is an elevation view, in section, of the core-melt source reduction system of FIG. 1 after the system has reacted and stopped the progression of the molten core including an embodiment for cooling the system.

The system 10 requires reasonable dissolution kinetics of core debris 20 in the molten glass 40 to avoid high temperatures and subsequent high containment 24 temperatures. Undissolved core debris 20 will float at the interface 38 between the molten glass 40 and the molten lead 42, as shown in FIG. 3. If there is a sufficient glass/lead interface 38 area for heat transfer, the existence of floating undissolved core debris 20 does not impact heat removal by the molten glass 40 to the water 26 above, or significantly raise the glass or lead temperatures. If a thick layer of insulative, heat generating core debris 20 totally covers this interface, it can heat the lead 42, and hence, the containment structure 24. The system 10 is constructed such that it has several mechanisms to prevent overheating of the containment 24 in this manner. It will take several hours to days to melt the glass, thus, providing a large amount time for glass dissolution. Dissolution rates are temperature sensitive such that with increasing temperatures, the dissolution rapidly accelerates. The thermal stratification of molten lead 42 when heated from above maximizes the temperature of the core debris 20, and, hence, the dissolution rates, while minimizing the temperatures elsewhere in the system 10.

The second task of the system 10 is to eliminate chemically reactive hot metals which generate burnable and noncondensable gases and which will not dissolve in the glass 40. As discussed, zirconium is a constituent of corium. At high temperatures, zirconium is highly reactive in that it is a powerful reducing agent. Under molten conditions, zirconium may remove oxygen from various glass formers as well as water through the reaction:

$$Zr + 2H_2O \rightarrow ZrO_2 + 2H_2 \uparrow.$$

The generation of large amounts of noncondensable hydrogen occurs as a result of this reaction. Because of the chemical reactivity of zirconium there is a requirement that the glass composition contain a sacrificial metal oxide which preferentially reacts with zirconium. The sacrificial metal oxide must react with zirconium to form zirconium oxide plus other reaction products. The reaction products must be sufficiently stable with water such that hydrogen or other noncondensable gases are not generated. The exothermic reaction between zirconium and the sacrificial metal oxide must have limited heat release to avoid potential overheating of the system. With these requirements in mind, there are many possible sacrificial metal oxides. Most of the possible sacrificial metal oxides are heavy metal or transition metal oxides, such as lead oxide, uranium oxide or iron oxide. The reaction with lead oxide is:

$$2PbO + Zr \rightarrow ZrO_2 + 2Pb.$$

Lead oxide is the preferred sacrificial metal oxide for many reasons. Lead metal does not further react with water of other materials in containment. It is chemically inert in the expected environment. The reaction product lead helps the system 10 operation by preventing rapid core debris 20 penetration of glass. There is limited energy release. If cold glass and stoichiometric quantities of molten zirconium metal chemically react, the reaction yields a glass with a low final product temperature.

A third task of the system 10 is to minimize heat rejection to the containment 24 early in the accident. Significant heat is generated in a core-melt accident from radioactive decay heat and chemical reactions such as those involving zirconium. Minimizing the heat release rate early in the accident helps to prevent overheating of the containment 24 which could lead to overpressurization and failure of the containment 24. To minimize heat release, the glass composition should have a significant heat capacity and heat of fusion to absorb the initial high heat loads. Minimizing the heat release also requires a sufficient volume of glass to adsorb the heat. The heat capacity of the glass should be such that it takes 4-8 hours for the core debris 20 to raise the glass temperature to its softening point. This large heat capacity provides time to dissolve debris 20 and for various heat transfer mechanisms to become fully operational. In practice, with the expected cooling with water 26 on top of the system 10, it may take several days to melt the glass.

The fourth task of the system 10 is to trap as much of the radionuclides in the system 10 as possible to minimize potential consequences of potential leakage through the containment 24. This is accomplished by selecting a glass composition with a high affinity for fission products and operating the system 10 at the lowest temperature possible to minimize volatilization of semi-volatile fission products from the molten glass 40 mixture. The glass composition selected has an impact on the retention of fission products in any water 26 above the system 10.

The fifth and ultimate goal of the system 10 is to generate a solidified stable glass matrix which has contained the molten core 20 after a nuclear reactor meltdown accident. As explained above, the operation of the system 10 stops the molten core 20 progression.

Figure 4:
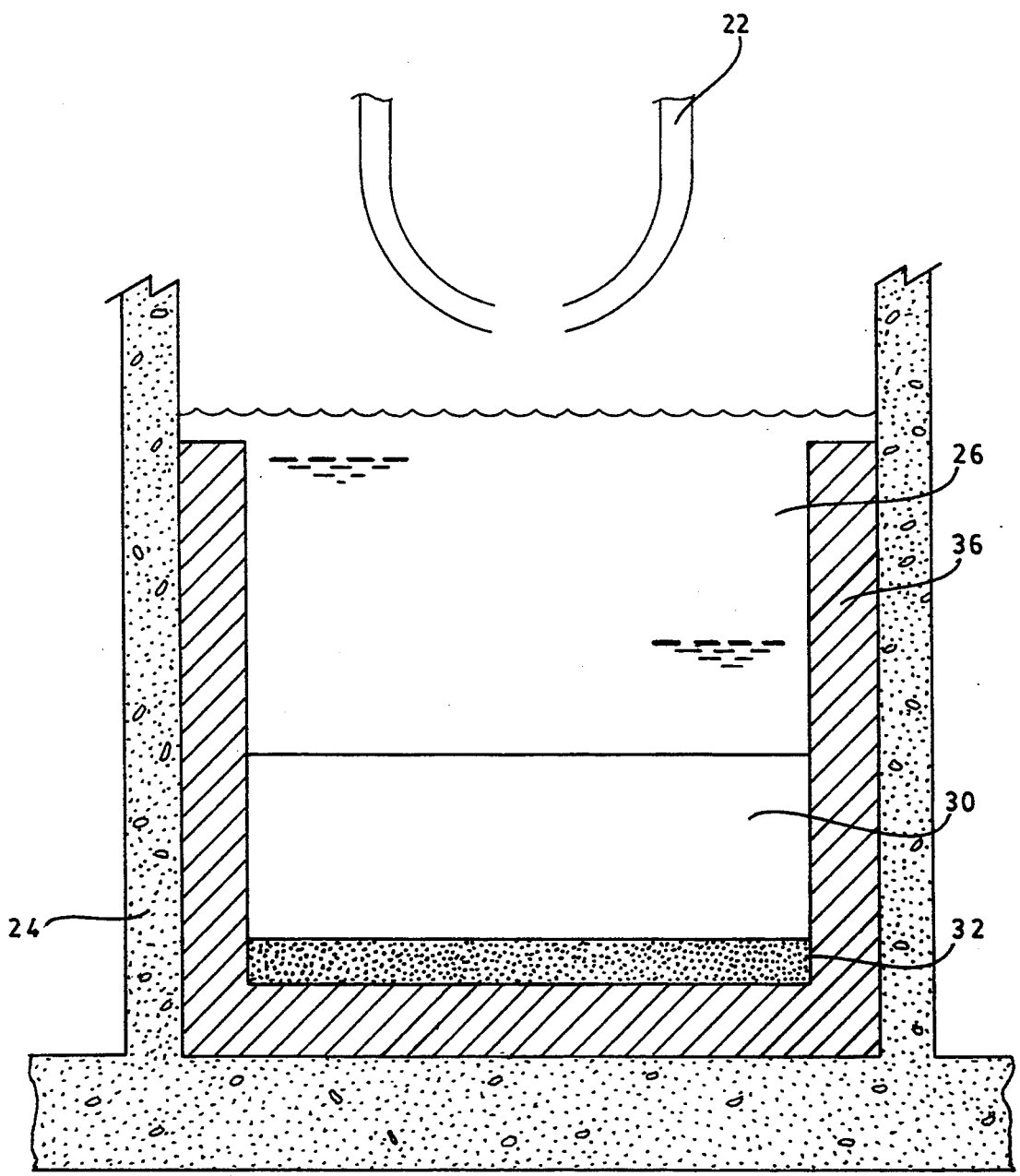

Within a period of days or weeks, a solidified, thermally hot mass of high level waste glass 30 results, as shown in FIG. 4. The high solidification temperature (700°–1200° C.) provides sufficient temperature gradients to ensure heat rejection to the water 26 above the system 10 and the containment 24 by thermal conduction. The radioactive decay heat continues. With the continued heat generation, the potential of slowly increasing temperatures in the nearby concrete containment 24 increases. If the temperatures are sufficiently high, damage to the structural integrity of the containment 24 may result. Methods to either limit heat flux to the surrounding containment 24 or lower the system's 10 temperature rapidly should be implemented. At this point in the accident, the system's geometry is favorable to cooling. From the top to the bottom, the major layers are water 26 above the system 10, a layer of solidified glass 30, a layer of solidified metal 32 (primarily lead), a layer of insulation 36 and the containment foundation 24, as shown in FIG. 4.

To avoid overheating the containment 24, there are primarily three cooling options to either lower the system's 10 temperature or limit heat flux to the containment structure 24. The first option is to ensure the resultant glass bed 30 fractures completely upon cooling to allow water circulation and cooling through the glass bed 30. This option requires brittle glass with a large thermal expansion coefficient for wide cracks and ideally a high thermal conductivity glass. Most glasses naturally have these properties. This cooling option can be radically improved depending upon the glass composition utilized in the system. Some pure glasses have a relatively high solubility in water, but the glass/core mixture is relatively insoluble in water. With such systems, the glass will selectively dissolve into water around the glass with core materials. This provides enhanced cooling exactly where it is needed, next to the high level waste glass.

A second option, as shown in FIG. 4, is to provide side and bottom insulation 36 placed between the system 10 and the containment 24. A suitable insulator would be refractory brick. Most of the long term decay heat in the system 10 will be transported upward to the water 26 or air above. The insulation 36 will limit heat fluxes and temperatures to the containment structure 24. Depending upon containment 24 geometry and effectiveness of the insulation 36, this may be sufficient to prevent damage to the containment structure 24.

A third option (not shown) is to place cooling coils under the system 10 and insulation 36 to maintain low containment structure 24 temperatures. Due to the expected low heat fluxes to the containment, passive cooling coils with water 26 from above the system 10 may be sufficient.

A combination of these cooling options may also be employed. The key to all of these options is that the system 10 operates at a sufficiently low temperature such that the insulation is effective and will survive.

In considering all of the above discussed points, a lead oxide-boron oxide ($PbO-B_2O_3$) glass system proves to have a unique set of characteristics which result in a very efficient system 10. Lead oxide is not itself a glass former, however, lead oxide and boron oxide combine to form glasses. Lead oxide serves as the sacrificial oxide which reacts with zirconium to form zirconium oxide and lead, which does not react with water. The system 10 works with molar ratios ranging from $4PbO:B_2O_3$ to $PbO:B_2O_3$. A sufficient amount of PbO is required to form a glass after the reactions with zirconium. The preferred glass composition is a mole ratio of $2PbO:B_2O_3$.

Boron oxide has the ability to dissolve most metal oxides, including uranium oxide, and form mixed oxide glasses. The glass composition with the ratio of $2PbO:B_2O_3$ has the highest solubility of uranium oxide ($UO_2$) and zirconium oxide ($ZrO_2$).

The thermal properties of the lead borate glass system are also attractive for use in the system 10. In combination with lead oxide, boron oxide produces glasses which have liquidus temperatures near 770° C. In these glasses, molten zirconium would preferentially react with lead oxide leaving the glass forming boron oxide and any dissolved oxide, such as uranium oxide, intact.

The density of the lead borate glass is about 6–7 $gm/cm^3$, depending upon the ratios of the lead oxide to boron oxide. The density is such that the molten glass 40 will float on molten lead 42. In this manner, lead will always be at the bottom of the system 10.

Another advantage to using lead oxide for the sacrificial metal oxide is that the reaction product, lead, limits the temperature of the system 10. The boiling point of lead metal is 1753° C. and the heat of vaporization at this temperature is 178 KJ/mol. Vaporization of lead limits the temperature of the system 10 and, thus, the release of fission products. This controls temperature rise due to decay heat release and chemical reactions of zirconium with lead oxide.

The solubility of $PbO$—$B_2O_3$ glass in water allows for a unique long term coolability. $PbO$—$B_2O_3$ glass dissolves in water but $PbO$—$B_2O_3$—$UO_2$ glasses are insoluble. After solidification of the glass, water will dissolve the lead borate glass next to the $PbO$—$B_2O_3$—$UO_2$ glass, where the lead borate glass is the hottest and most soluble. This allows efficient water flow and cooling next to the warm glass mass, where long term cooling is desired. The solubility of the system can be decreased by small additions of silica ($SiO_2$). It may be desirable to lower the solubility of the glass when considering long term storage such that the $B_2O_3$ is not selectively leached out of the glass.

From the foregoing description, it will be recognized by those skilled in the art that a core-melt source reduction system offering advantages over the prior art has been provided. Specifically, the system provides a structure which slows and eventually stops the progression of a molten core during a core meltdown accident. Moreover, the system provides a structure which prevents containment failure due to overpressurization or overheating. Further, the system ends the accident sequence with a long term, cold, stable state matrix.

While a preferred embodiment has been shown and described, it will be understood that it is not intended to limit the disclosure, but rather it is intended to cover all modifications and alternate methods falling within the spirit and the scope of the invention as defined in the appended claims and their equivalents.

Having thus described the aforementioned invention, I claim:

1. A core-melt source reduction system which is supported within a nuclear reactor containment structure for catching and stopping the progression of a molten core during a core meltdown accident such that the containment structure of the reactor does not deteriorate, the core-melt source reduction system comprising:
    a plurality of layers of a first material for chemically reacting with the molten core to absorb the molten core, and;
    a plurality of layers of lead, one each of said plurality of layers of said lead being disposed between each consecutive pair of said plurality of layers of said first material, each of said plurality of layers of said lead being substantially thinner than each of said plurality of layers of said first material, said plurality of layers of said lead for slowing the progression of the molten core such that the molten core can sufficiently react with said plurality of layers of said first material.

2. The core-melt source reduction system of claim 1 wherein said first material is glass.

3. The core-melt source reduction system of claim 2 wherein said glass has a softening point lower than 1200° C. said glass having a density less than a density of said second material, said glass being able to dissolve a portion of the molten core.

4. The core-melt source reduction system of claim 2 wherein said glass includes a sacrificial metal oxide for reacting with the molten core such that the reaction products are stable in the presence of air and water.

5. The core-melt source reduction system of claim 4 wherein said sacrificial metal oxide is lead oxide.

6. The core-melt source reduction system of claim 2 wherein said glass is comprised of 1 to 4 moles of lead oxide and 1 mole of boron oxide.

7. The core-melt source reduction system of claim 1 wherein said system includes thermal insulation surrounding said system and resting on the containment structure, said insulation for protecting the containment structure from high temperatures.

8. A core-melt source reduction system which is supported within a nuclear reactor containment structure for catching and stopping the progression of a molten core during a core meltdown accident such that the containment structure of the reactor does not deteriorate, the core-melt source reduction system comprising:
    a plurality of layers of a glass material for chemically reacting with the molten core to absorb the molten core, said glass material having a density, said glass material having a softening point lower than 1200° C., said glass material dissolving a portion of the molten core, and;
    a plurality of layers of a second material, one each of said plurality of layers of said second material being disposed between each consecutive pair of said plurality of layers of said glass material, each of said plurality of layers of said second material being substantially thinner than each of said plurality of layers of said glass material, said plurality of layers of said second material for slowing the progression of the molten core such that the molten core can sufficiently react with said plurality of layers of said glass material.

9. The core-melt source reduction system of claim 8 wherein said glass material includes a sacrificial metal oxide for reacting with the molten core such that the reaction products are stable in the presence of air and water.

10. The core-melt source reduction system of claim 9 wherein said sacrificial metal oxide is lead oxide.

11. The core-melt source reduction system of claim 8 wherein said density of said glass material is less than a density of said second material.

12. The core-melt source reduction system of claim 8 wherein said glass material is comprised of 1 to 4 moles of lead oxide and 1 mole of boron oxide.

13. The core-melt source reduction system of claim 8 wherein said second material is lead.

14. The core-melt source reduction system of claim 8 wherein said system includes thermal insulation surrounding said system and resting on the containment structure, said insulation for protecting the containment structure from high temperatures.

15. A core-melt source reduction system which is supported within a nuclear reactor containment structure for catching and stopping the progression of a molten core during a core meltdown accident such that the containment structure of the reactor does not deteriorate, the core-melt source reduction system comprising:
 a plurality of layers of a glass material for chemically reacting with the molten core to absorb the molten core, said glass material having a density, said glass material having a softening point lower than 1200° C., said glass material dissolving a portion of the molten core, and;
 a plurality of layers of lead, one each of said plurality of layers of lead being disposed between each consecutive pair of said plurality of layers of said glass material, each of said plurality of layers of lead being substantially thinner than each of said plurality of layers of said glass material, said lead having a density more than said density of said glass material, said plurality of layers of lead for slowing the progression of the molten core such that the molten core can sufficiently react with said plurality of layers of said glass material.

16. The core-melt source reduction system of claim 15 wherein said glass material includes a sacrificial metal oxide for reacting with the molten core such that the reaction products are stable in the presence of air and water.

17. The core-melt source reduction system of claim 16 wherein said sacrificial metal oxide is lead oxide.

18. The core-melt source reduction system of claim 15 wherein said glass material is comprised of 1 to 4 moles of lead oxide and 1 mole of boron oxide.

19. The core-melt source reduction system of claim 15 wherein said system includes thermal insulation surrounding said system and resting on the containment structure, said insulation for protecting the containment structure from high temperatures.

20. A core-melt source reduction system which is supported within a nuclear reactor containment structure for catching and stopping the progression of a molten core during a core meltdown accident such that the containment structure of the reactor does not deteriorate, the core-melt source reduction system comprising:
 a plurality of layers of a glass material for chemically reacting with the molten core to absorb the molten core, said glass including lead oxide for chemically reacting with the molten core such that the reaction products are stable in the presence of air and water and;
 a plurality of layers of a second material, one each of said plurality of layers of said second material being disposed between each consecutive pair of said plurality of layers of said glass material, each of said plurality of layers of said second material being substantially thinner than each of said plurality of layers of said glass material, said plurality of layers of said second material for slowing the progression of the molten core such that the molten core can sufficiently react with said plurality of layers of said glass material.

21. The core-melt source reduction system of claim 20 wherein said glass has a softening point lower than 1200° C., said glass having a density less than a density of said second material, said glass being able to dissolve a portion of the molten core.

22. The core-melt source reduction system of claim 20 wherein said glass is comprised of 1 to 4 moles of lead oxide and 1 mole of boron oxide.

23. The core-melt source reduction system of claim 22 wherein said second material is stainless steel.

24. The core-melt source reduction system of claim 20 wherein said second material is lead.

25. The core-melt source reduction system of claim 20 wherein said system includes thermal insulation surrounding said system and resting on the containment structure, said insulation for protecting the containment structure from high temperatures.

26. A core-melt source reduction system which is supported within a nuclear reactor containment structure for catching and stopping the progression of a molten core during a core meltdown accident such that the containment structure of the reactor does not deteriorate, the core-melt source reduction system comprising:
 a plurality of layers of a glass material for chemically reacting with the molten core to absorb the molten core, said glass material being comprised of 1 to 4 moles of lead oxide and 1 mole of boron oxide, and;
 a plurality of layers of a second material, one each of said plurality of layers of said second material being disposed between each consecutive pair of said plurality of layers of said glass material, each of said plurality of layers of said second material being substantially thinner than each of said plurality of layers of said glass material, said plurality of layers of said second material for slowing the progression of the molten core such that the molten core can sufficiently react with said plurality of layers of said glass material.

27. The core-melt source reduction system of claim 26 wherein said glass has a softening point lower than 1200° C., said glass having a density less than a density of said second material, said glass being able to dissolve a portion of the molten core.

28. The core-melt source reduction system of claim 26 wherein said glass includes a sacrificial metal oxide for reacting with the molten core such that the reaction products are stable in the presence of air and water.

29. The core-melt source reduction system of claim 28 wherein said sacrificial metal oxide is lead oxide.

30. The core-melt source reduction system of claim 26 wherein said second material is stainless steel.

31. The core-melt source reduction system of claim 21 wherein said second material is lead.

32. The core-melt source reduction system of claim 26 wherein said system includes thermal insulation surrounding said system and resting on the containment structure, said insulation for protecting the containment structure from high temperatures.

* * * * *